United States Patent Office 3,585,224
Patented June 15, 1971

3,585,224
PRODUCTION OF AMIDES AND POLYAMIDES
Friedrich Becke, Heidelberg, and Josef Gnad, Ludwigshafen (Rhine), Germany, assignors to Badische Anilin- & Soda-Fabrik Aktiengesellschaft, Ludwigshafen Rhineland, Germany
No Drawing. Filed Sept. 6, 1967, Ser. No. 665,734
Claims priority, application Germany, Sept. 9, 1966,
P 12 83 220.1
Int. Cl. C09f 7/00; C07c 103/12, 103/14, 103/32, 103/58
U.S. Cl. 260—404
10 Claims

ABSTRACT OF THE DISCLOSURE

Production of amides and polyamides by reacting carboxylic nitriles with formic acid at 150° to 350° C. and superatmospheric pressure. Carboxylic amides are suitable for the production of plant protection agents. By hydrolysis of the polyamides, aminoacids are obtained which are suitable for the production of synthetic nutrient solutions for microorganisms.

---

This invention relates to a process for the production of carboxylic amides and polyamides from carboxylic nitriles.

It is known from Houben-Weyl, Methoden der organischen Chemie, vol. 8 (1952), p. 661, that when nitriles are heated with water at 180° C., amides are obtained as well as ammonium salts of carboxylic acids. The process has the disadvantage that the ammonium salts of carboxylic acids have to be separated. It is also known (loc. cit., p. 662) that hydrolysis of nitriles to amides is possible with concentrated sulfuric acid or caustic soda solution. In many cases, however, the reaction proceeds very slowly. It has also been disclosed (loc. cit., p. 663) that amides are also obtained in the hydrolysis of nitriles with hydrogen peroxide in weak alkaline solution. Halogen-substituted nitriles are however unsuitable for the reaction because halogen is partly eliminated. Unsaturated nitriles are attacked at the double bond under the reaction conditions.

It is an object of the invention to provide an improved process in which amides or polyamides are obtained in high yields. Another object of the invention is to provide an improved process in which amides or polyamides are obtained in pure form. A further object of the invention is to provide a process in which unsaturated amides or polyamides are obtained without appreciable secondary reactions.

In accordance with this invention, these and other objects and advantages are achieved in the production of amides or polyamides from nitriles by reacting a nitrile with formic acid at elevated temperature and superatmospheric pressure.

It is preferred to use for the reaction aliphatic, cycloaliphatic, araliphatic or aromatic nitriles having up to twelve carbon atoms. Nitriles which are derived from alkanes, cycloalkanes, aralkanes or aryls having up to twelve carbon atoms are particularly suitable. They may be unsaturated, for example they may contain up to three double bonds, particularly one double bond, in the molecule and/or they may bear substituents which are inert under the reaction conditions, such as halogen atoms, alkoxy groups having one to four carbon atoms or nitro groups in aromatic combination. The nitrile group may be contained more than once, for example twice, in the molecule. Examples of suitable nitriles are: acetonitrile, propionitrile, butyronitrile, isobutyronitrile, undecanonitrile, cyclohexyl cyanide, phenylacetonitrile, benzonitrile, p-methoxybenzonitrile, p-chlorobenzonitrile, m-chlorobenzonitrile, m - nitrobenzonitrile, chloroacetonitrile, adiponitrile, suberonitrile, terephthalonitrile or undecylenonitrile.

When hydroxycarboxylic nitriles are used as starting materials for the reaction, the corresponding polyamides are obtained. The polyamides may be hydrolyzed to aminoacids by conventional methods, for example by treatment with aqueous mineral acids or caustic alkali solutions.

Preferred hydroxycarboxylic nitriles for use in the process are aliphatic, cycloaliphatic or araliphatic hydroxycarboxylic nitriles having up to twelve carbon atoms in which the hyrdoxyl group is not attached to an aromatic nucleus. The hydroxyl group in the preferred starting materials may occupy any position relative to the nitrile group, it is however preferably in α-position or β-position to the nitrile group. α-Hydroxycarboxylic nitriles and β-hydroxycarboxylic nitriles having two to ten carbon atoms, particularly two to six carbon atoms (which are readily accessible by adding on hydrogen cyanide to aldehydes or epoxides) are particularly preferred as starting materials. The starting materials may contain, in addition to the hydroxyl group and nitrile group, substituents which are inert under the reaction conditions, such as aromatically combined halogen atoms or alkoxy groups having one to four carbon atoms. The hydroxycarboxylic nitriles used may also be olefinically unsaturated, for example may contain one or two double bonds. It is however preferred to use the hydroxycarboxylic nitriles which have hydrocarbon structure apart from the hydroxyl group and the nitrile group. Examples of suitable hydroxycarboxylic nitriles are α-hydroxypropiononitrile, β-hydroxypropiononitrile, omega-hydroxycapronitrile, α - hydroxy - β-methylbutyronitrile, cyclohexene cyanohydrin and p-methylolbenzonitrile.

The reaction is carried out with formic acid. It is preferable to use formic acid of more than 80% by weight strength. Particularly good results are obtained when 98 to 100% by weight formic acid is used.

The nitrile and formic acid are in general used in equivalent amounts. It is possible to use the nitrile in excess, for example up to 500 mole percent.

The reaction is advantageously carried out at temperatures of 150° to 350° C., preferably 180° to 260° C. The pressure is determined by the vapor pressures of the reactants, the solvent and the substances formed during the reaction at the temperature used. for example 5 atmospheres. There is no detrimental effect when higher pressures, for example up to 200 atmospheres, are used.

It is possible to carry out the reaction in the presence of solvents which are liquid and inert under the reaction conditions and have a boiling range of from 50° to 200° C. Examples of suitable solvents are hydrocarbons, such as cyclohexane or toluene; chlorohydrocarbons, such as chlorobenzene; or ethers, such as tetrahydrofuran or dioxane. It is advantageous to use the nitrile concerned in excess as a solvent.

The process according to the invention may be carried out for example by mixing the nitrile and formic acid in the specified ratio, in the presence or absence of an inert solvent, and bringing them to the said temperatures in an autoclave. The reaction is in general over after one to four hours. When the contents of the autoclave are cooled and the pressure thereon is released, the amide separates out in solid form, if necessary after distilling off excess solvent, and may then be purified, if necessary, by conventional methods, for example by recrystallization.

In a preferred industrial embodiment, the nitrile and formic acid are continuously metered (separately or mixed together) under the abovementioned conditions into a reaction tube or into a cascade of two or more reactors, for example two to four reactors. The reaction solution is worked up as described above.

Amides prepared according to this invention are suitable for the production of plant protection agents. Aminoacids which may be used as nutrients for microorganisms may be obtained from the polyamides prepared by the process by hydrolysis with mineral acids.

The invention is illustrated by the following examples in which the parts given are parts by weight.

EXAMPLE 1

68.5 parts of p-chlorobenzonitrile and 23 parts of formic acid (about 100%) are heated in an autoclave for about two hours at 250° C. The reaction mixture is allowed to cool and the pressure thereon is released. The product which has separated out is isolated by filtration and recrystallized from alcohol. 65 parts of p-chlorobenzamide having a melting point of 170° to 173° C. is obtained. The yield is 97% of the theory with reference to p-chlorobenzonitrile reacted.

EXAMPLE 2

82.5 parts of undecylenonitrile is reacted with 23 parts of formic acid analogously to Example 1. 47 parts of undecylenamide is obtained having a melting point of 82° C. The yield is 91% of the theory with reference to undecylenonitrile reacted.

EXAMPLE 3

68.5 parts of 3-chlorobenzonitrile is reacted with 23 parts of formic acid as described in Example 1. 70 parts of m-chlorobenzamide is obtained having a melting point of 127° C. This is a yield of 90% of the theory with reference to 3-chlorobenzonitrile reacted.

EXAMPLE 4

128 parts of terephthalonitrile is heated with 92 parts of formic acid (100%) in an autoclave for two hours at 250° C. 168 parts of terephthalodiamide is obtained, i.e. a yield of 96% of the theory with reference to terephthalonitrile reacted.

EXAMPLE 5

99 parts of isobutyraldehyde cyanohydrin is heated with 100 parts of formic acid in an autoclave for five hours at 190° to 200° C. The contents are then taken up in about 300 parts of water and hydrolyzed with 350 parts of 50% sulfuric acid at 100° C. The solution is then just neutralized with barium hydroxide and the precipitate of barium sulfate is filtered off. The filtrate is concentrated in vacuo and the valine formed is purified by repeated washing with methanol followed by recrystallization from water. 89 parts (76% of the theory) of valine is obtained.

EXAMPLE 6

198 parts of n-butyraldehyde cyanohydrin is heated with 200 parts of formic acid for five hours at 190° C. The reaction product is cooled, discharged and hydrolyzed. 240 parts of reaction mixture is heated under reflux with 1000 parts of 50% sulfuric acid for five hours, cooled and exactly neutralized with barium hydroxide. The barium sulfate is then filtered off and the filtrate is concentrated. The residue is recrystallized from methanol. 187.5 parts of α-aminovaleric acid is obtained, i.e. a yield of 87% of the theory.

EXAMPLE 7

71 parts of ethylene cyanohydrin and 75 parts of 100% formic acid are heated for three hours at 190° to 200° C. in an autoclave. The whole is cooled and the pressure is released. The reaction mixture is dissolved in 500 parts of water, 400 parts of 60% sulfuric acid is added and the whole is heated under reflux for five hours. The amino-acid is isolated from the resultant solution in the manner described in Example 1. 82 parts (92 of the theory) of β-alanine is obtained having a melting point of 193° to 194° C.

We claim:

1. A process for the production of amides and polyamides from nitriles at elevated temperatures and superatmospheric pressure which comprises reacting an alkyl, alkenyl or cycloalkyl nitrile having up to twelve carbon atoms, a phenylalkyl nitrile having up to twelve carbon atoms, benzonitrile, one of said nitriles bearing as substituents hydroxy, halogen, or alkoxy of 1–4 carbon atoms, methylolbenzonitrile, one of said aromatic nitriles having a nitro substituent on the aromatic ring, alkylene dinitriles having up to twelve carbon atoms and phenylene dinitriles with formic acid of more than 80% by weight strength in a mixture thereof at a respective mol ratio of 1–5:1 at a temperature of from 150° to 350° C. and at a pressure from the vapor pressure of the reactants up to 200 atmospheres.

2. A process as claimed in claim 1 wherein the nitrile and the formic acid are used in equivalent proportions.

3. A process as claimed in claim 1 wherein formic acid of 98 to 100% by weight purity is used.

4. A process as claimed in claim 1 wherein an aliphatic α-hydroxycarboxylic nitrile having two to ten carbon atoms is used as starting material.

5. A process as claimed in claim 1 wherein an aliphatic β-hydroxycarboxylic nitrile having two to ten carbon atoms is used as starting material.

6. A process as claimed in claim 1 wherein said molar excess of the nitrile is used as a solvent.

7. A process as claimed in claim 1 wherein the temperature used is from 180° to 260° C.

8. A process as claimed in claim 1 wherein the reaction is carried out at a pressure determined by the vapor pressure of the reactants, of the solvent and of the amide or polyamide formed during the reaction at the reaction temperature.

9. A process as claimed in claim 1 wherein the reactants are formic acid and acetonitrile, propionitrile, butyronitrile, isobutyronitrile, undecanonitrile, cyclohexyl cyanide, phenylacetonitrile, benzonitrile, p-methoxybenzonitrile, p-chlorobenzonitrile, m-chlorobenzonitrile, m-nitrobenzonitrile, chloroacetonitrile, adiponitrile, suberonitrile, terephthalonitrile or undecylenonitrile.

10. A process as claimed in claim 1 wherein the reactants are formic acid and α-hydroxypropiononitrile, β-hydroxypropiononitrile, omega - hydroxycapronitrile, α-hydroxy-β-methylbutyronitrile, cyclohexene cyanohydrin or p-methylolbenzonitrile.

References Cited

UNITED STATES PATENTS

| | | | |
|---|---|---|---|
| 2,232,598 | 2/1941 | Farlow | 260—561 |
| 2,457,660 | 12/1948 | Gresham et al. | 260—561 |
| 2,534,204 | 12/1950 | Mowry | 260—404.5 |
| 3,062,883 | 11/1962 | Gilbert et al. | 260—561 |
| 3,166,588 | 1/1965 | Johnson | 260—562 |
| 2,070,991 | 2/1937 | Hund et al. | 260—561 |
| 2,425,542 | 8/1947 | Krieble et al. | 260—561 |
| 2,448,125 | 8/1948 | Sallman et al. | 260—561 |
| 2,742,501 | 4/1956 | Keine et al. | 260—561 |
| 3,366,639 | 1/1968 | Haefele | 260—561 |

OTHER REFERENCES

Watanabe: "Bul. Chem. Soc. Jap. Bd. 37(9), 1325–29.

Krieble et al.: "J. Ame. Chem. Soc. vol. 61, pp. 560–63.

Kretov et al.: "Reaction of Cyanamide With Organic Acids" (1961), CA55, pp. 17496–97 (1961).

Van Es et al.: "Reactions With Ravey Alloy in Acid Sol." (1965), J. Chem. Soc. 1965, pp. 5775–77.

LEWIS GOTTS, Primary Examiner

G. HOLLRAH, Assistant Examiner

U.S. Cl. X.R.

260—404.5, 518, 534, 561; 424—318, 319, 320, 324